(12) United States Patent
Beekman et al.

(10) Patent No.: US 11,022,117 B2
(45) Date of Patent: *Jun. 1, 2021

(54) VARIABLE CAPACITY SCREW COMPRESSOR AND METHOD

(71) Applicant: Trane International Inc., Piscataway, NJ (US)

(72) Inventors: Dennis M. Beekman, La Crosse, WI (US); Daniel R. Crum, La Crosse, WI (US); Timothy Sean Hagen, Onalaska, WI (US); Dennis R. Dorman, La Crosse, WI (US); John R. Sauls, La Crosse, WI (US)

(73) Assignee: Trane International Inc., Davidson, NC (US)

( * ) Notice: Subject to any disclaimer, the term of this patent is extended or adjusted under 35 U.S.C. 154(b) by 316 days.

This patent is subject to a terminal disclaimer.

(21) Appl. No.: 14/512,992

(22) Filed: Oct. 13, 2014

(65) Prior Publication Data
US 2015/0030489 A1    Jan. 29, 2015

Related U.S. Application Data

(63) Continuation of application No. 12/840,018, filed on Jul. 20, 2010.

(51) Int. Cl.
*F04C 18/16* (2006.01)
*F04C 28/08* (2006.01)
(Continued)

(52) U.S. Cl.
CPC .............. *F04C 18/16* (2013.01); *F01C 21/02* (2013.01); *F04C 28/08* (2013.01); *F25B 1/047* (2013.01);
(Continued)

(58) Field of Classification Search
CPC ........ F25B 49/025; F25B 1/047; F04C 18/16; F04C 28/08; F04C 2270/052;
(Continued)

(56) References Cited

U.S. PATENT DOCUMENTS 2,243,874 A * 6/1941 Lysholm ................. F04C 18/16
418/201.1
3,945,216 A    3/1976 Schibbye
(Continued)

FOREIGN PATENT DOCUMENTS

EP    0085285    8/1983
EP    1498611    1/2005
(Continued)

OTHER PUBLICATIONS

Wennemar, "Dry Screw Compressor Performnce and Application Range", "Man turbo AG", 2009, Germany, pp. 149-156.*
(Continued)

*Primary Examiner* — Charles G Freay
*Assistant Examiner* — Lilya Pekarskaya
(74) *Attorney, Agent, or Firm* — Hamre, Schumann, Mueller & Larson, P.C.

(57) ABSTRACT

A variable capacity screw compressor comprises a suction port, at least two screw rotors and a discharge port being configured in relation to a selected rotational speed that operates at least one screw rotor at an optimum peripheral velocity that is independent of a peripheral velocity of the at least one screw rotor at a synchronous motor rotational speed for a rated screw compressor capacity. A motor is configured to drive the at least one screw rotor at a rotational speed at a full-load capacity that is substantially greater than the synchronous motor rotational speed at the rated screw compressor capacity. A variable speed drive receives a
(Continued)

command signal from a controller and generates a control signal that drives the motor at the selected rotational speed.

8 Claims, 4 Drawing Sheets

(51) Int. Cl.
    *F25B 49/02*           (2006.01)
    *F25B 1/047*          (2006.01)
    *F01C 21/02*          (2006.01)

(52) U.S. Cl.
    CPC ........ *F25B 49/025* (2013.01); *F04C 2210/26* (2013.01); *F04C 2270/052* (2013.01); *F25B 2600/021* (2013.01); *Y02B 30/70* (2013.01)

(58) Field of Classification Search
    CPC ............. F04C 2210/26; F04C 2600/021; F04C 21/02; F01C 21/02
    USPC .................................... 417/410.4, 41
    See application file for complete search history.

(56) References Cited

U.S. PATENT DOCUMENTS

| | | | |
|---|---|---|---|
| 4,042,310 A | 8/1977 | Schibbye et al. | |
| 4,076,468 A | 2/1978 | Persson et al. | |
| 4,181,474 A | 1/1980 | Shaw | |
| 4,335,582 A | 6/1982 | Shaw et al. | |
| RE30,994 E | 7/1982 | Shaw | |
| 4,435,139 A | 3/1984 | Astberg | |
| 4,460,322 A | 7/1984 | Schibbye et al. | |
| 4,490,102 A | 12/1984 | Cane et al. | |
| 4,611,976 A | 9/1986 | Schibbye et al. | |
| 4,730,995 A | 3/1988 | Dewhirst | |
| 4,747,755 A | 5/1988 | Ohtsuki et al. | |
| 4,780,061 A | 10/1988 | Butterworth | |
| 4,871,299 A | 10/1989 | Hrabal | |
| 5,009,583 A | 4/1991 | Carlsson et al. | |
| 5,027,608 A | 7/1991 | Rentmeester et al. | |
| 5,515,694 A | 5/1996 | Meloling et al. | |
| 5,556,271 A | 9/1996 | Zuercher et al. | |
| 5,642,992 A | 7/1997 | Shaw | |
| 5,694,682 A | 12/1997 | Zuercher et al. | |
| 5,695,327 A | 12/1997 | Heinen et al. | |
| 5,807,091 A | 9/1998 | Shaw | |
| 5,961,291 A | 10/1999 | Sakagami et al. | |
| 6,003,324 A | 12/1999 | Shaw | |
| 6,216,474 B1 | 4/2001 | Sishtla | |
| 6,217,304 B1 | 4/2001 | Shaw | |
| 6,287,088 B1 | 9/2001 | Nishimura et al. | |
| 6,290,480 B1 | 9/2001 | Lifson | |
| 6,364,645 B1 | 4/2002 | Dieterich | |
| 6,461,112 B1 | 10/2002 | Ohta et al. | |
| 6,471,492 B2 | 10/2002 | Nishimura et al. | |
| 6,474,950 B1 | 11/2002 | Waldo | |
| 6,478,560 B1 | 11/2002 | Bowman | |
| 6,506,038 B2* | 1/2003 | Sjoholm ................ F01C 21/02 | |
| | | | 29/888.023 |
| 6,520,758 B1 | 2/2003 | Sowards | |
| 6,572,354 B2* | 6/2003 | Kammhoff ............ F04C 23/008 | |
| | | | 418/104 |
| 6,595,763 B2 | 7/2003 | Wagner et al. | |
| 6,659,729 B2 | 12/2003 | Hattori et al. | |
| 6,666,661 B2 | 12/2003 | Dieterich | |
| 6,786,710 B2 | 9/2004 | Rousseau | |
| 6,848,891 B2 | 2/2005 | Dieterich | |
| 6,860,730 B2 | 3/2005 | Leppanen | |
| 6,881,040 B2 | 4/2005 | Hattori et al. | |
| 7,096,681 B2* | 8/2006 | Wills ...................... F04C 18/16 | |
| | | | 417/2 |
| 7,165,947 B2 | 1/2007 | Hattori et al. | |
| 7,201,569 B2 | 4/2007 | Hossner | |
| 7,293,543 B1 | 11/2007 | Scekic | |
| 7,334,428 B2 | 2/2008 | Holdsworth | |
| 7,481,634 B2 | 1/2009 | Candi et al. | |
| 7,547,203 B2 | 6/2009 | Dieterich | |
| 7,856,834 B2 | 12/2010 | Haley | |
| 8,021,127 B2 | 9/2011 | De Larminat | |
| 8,193,756 B2 | 6/2012 | Jadric et al. | |
| 8,215,936 B2 | 7/2012 | Mosemann et al. | |
| 8,286,439 B2 | 10/2012 | Wu et al. | |
| 8,365,544 B2 | 2/2013 | Foye et al. | |
| 8,702,408 B2 | 4/2014 | Yount et al. | |
| 2001/0021349 A1 | 9/2001 | Nishimura | |
| 2003/0215338 A1 | 11/2003 | Leppanen | |
| 2004/0086410 A1 | 5/2004 | Dieterich | |
| 2004/0101411 A1 | 5/2004 | Nichol et al. | |
| 2004/0146414 A1 | 7/2004 | Nichol | |
| 2005/0188708 A1 | 9/2005 | Wills et al. | |
| 2006/0117790 A1 | 6/2006 | Dieterich | |
| 2006/0243520 A1 | 11/2006 | Hertenstein et al. | |
| 2007/0074535 A1 | 4/2007 | Holdsworth | |
| 2007/0172370 A1 | 7/2007 | Takano et al. | |
| 2007/0241627 A1 | 10/2007 | Kharsa | |
| 2008/0031762 A1 | 2/2008 | Mosemann et al. | |
| 2008/0031986 A1 | 2/2008 | Tripp et al. | |
| 2008/0038127 A1 | 2/2008 | Yonemoto et al. | |
| 2008/0085207 A1 | 4/2008 | Mosemann et al. | |
| 2008/0115527 A1 | 5/2008 | Doty et al. | |
| 2009/0060759 A1* | 3/2009 | Sishtla ................ F04B 39/005 | |
| | | | 417/312 |
| 2009/0246054 A1 | 10/2009 | Achtelik et al. | |
| 2009/0311119 A1 | 12/2009 | Holden et al. | |
| 2010/0083692 A1 | 4/2010 | Todd et al. | |
| 2011/0262290 A1 | 10/2011 | Lifson | |
| 2012/0017634 A1 | 1/2012 | Dorman et al. | |
| 2013/0101390 A1 | 4/2013 | Nachtergaele et al. | |
| 2013/0108495 A1 | 5/2013 | Bakkestuen et al. | |
| 2013/0301967 A1 | 11/2013 | Schulz et al. | |
| 2014/0127067 A1 | 5/2014 | Kienzle | |

FOREIGN PATENT DOCUMENTS

| | | |
|---|---|---|
| EP | 1669606 | 6/2006 |
| WO | 2008/082410 | 10/2008 |
| WO | 2009/058975 | 5/2009 |
| WO | 2011/038176 | 3/2011 |

OTHER PUBLICATIONS

European Patent Office, Communication pursuant to Rules 161(1) and 162 EPC, in application No. 11736259.0, dated Jun. 14, 2013, 14 pages.
International Search Report and Written Opinion dated Apr. 22, 2013, and International Preliminary Report on Patentability dated Apr. 30, 2013, for International application no. PCT/US2011/044532 filed Jul. 19, 2011.
The State Intellectual Property Office of the People's Republic of China, Notice on the First Office Action, Application/Patent No. 2011800354212 dated May 13, 2015 (23 pages).
Stosic, N., et al., Optimisation of Screw Compressors, Applied Thermal Engineering 23 (2003) 1177-1195, Feb. 22, 2003.
Extended European Search Report, dated Jul. 21, 2015, in European Application No. 15156012.5.

* cited by examiner

VARIABLE CAPACITY SCREW COMPRESSOR AND METHOD

BACKGROUND OF THE INVENTION

This invention relates generally to screw compressors for refrigeration systems. Particularly, the invention relates to screw compressors for refrigeration systems that are operable at a rotational speed substantially above a synchronous motor rotational speed for a rated capacity and that have an inlet port, a discharge port, screw rotors and a selected rotational speed configured such that the selected rotational speed drives at least one screw rotor at an optimum peripheral velocity independent of the rated capacity of the screw compressor. Configuring the inlet port, the discharge port and the screw rotors together with the selected rotational speed allows for a plurality of screw compressors to be produced with different rated capacities, such that each screw compressor delivers approximately the same high efficiency from operation of at least one screw rotor at the same optimum peripheral velocity.

Compressors in refrigeration systems raise the pressure of a refrigerant from an evaporator pressure to a condenser pressure. The evaporator pressure is sometimes referred to as the suction pressure. The condenser pressure is sometimes referred to as the discharge pressure. At the suction pressure, the refrigerant is capable of cooling a desired medium.

Many compressor types, including rotary screw compressors, are used in such refrigeration systems. Rotary screw compressors, or screw compressors, are positive displacement, volume reduction devices.

Screw compressors typically employ a male screw rotor and female screw rotor, sometimes in the form of helical intermeshing rotors. A screw compressor arrangement having an intermeshing male screw rotor and female screw rotor is also sometimes called twin screw compressor. Helical intermeshing rotors have a geometry or profile that is defined, in part, by the number of rotor lobes, the wrap angle, the length of the rotors and the diameter of the rotors, for example. One profile of rotors is not universal to all screw compressors.

The intermeshing screw rotors are mounted for rotation in a working chamber defined by a compressor or rotor housing. The working chamber consists of a volume shaped as a pair of parallel intersecting flat-ended cylinders and is closely toleranced to the exterior dimensions and shapes of the intermeshing screw rotors. The clearance tolerances between the surface of the working chamber and exterior of the intermeshed screw rotors can be as low as a few micrometers.

The screw compressor has a low pressure end and a high pressure end. The low pressure end contains a suction port. The high pressure end contains a discharge port. The low pressure end and the high pressure end each open into the working chamber.

In conventional operation of refrigeration-based systems, the counter-rotation of the intermeshing screw rotors draws a mass of refrigerant gas at suction pressure into the suction port from a suction area at the low pressure end of the compressor. The refrigerant is delivered through the suction port to a compression pocket having a chevron shape, sometimes called a flute space. The compression pocket is defined by the intermeshed rotors and the interior wall of the working chamber.

As the intermeshing screw rotors rotate, the compression pocket is closed off from the suction port. Gas compression occurs as the compression pocket volume decreases as the intermeshing screw rotors rotate. The compression pocket is circumferentially and axially displaced to the high pressure end of the compressor by the rotation of the intermeshing screw rotors and comes into communication with the discharge port. The compressed refrigerant gas is discharged through the discharge port from the working chamber.

It is often desirable to operate such screw compressors at part-load conditions (i.e. when full capacity operation is not required). To improve performance at part-load conditions, several approaches have been employed.

One approach that has been employed is the use of slide valve arrangements. These slide valve arrangements may take the form of a slide valve assembly. A valve portion of a slide valve assembly is typically disposed within the working chamber. The slide valve is opened (or closed) to varying degrees to vary capacity from a full-load to a part-load. When the slide valve is opened (or closed) to vary capacity, the working chamber and the screw rotors are exposed to a larger (or lesser) extent to the suction pressure. Generally, the slide valve assembly accommodates part-load performance, because the working chamber and the screw rotors that are exposed to the suction pressure cannot engage in the compression process and thereby, the screw compressor's capacity is reduced proportionately. Improved part-load performance can be achieved with these slide valve arrangements through control of the discharge port.

Inclusion of such slide valve arrangements increases the mechanical complexities of the screw compressor because of the increase in the physical part count, the precision machining needed for sealing, and their reduction of efficiency at part load by, for example, further increasing leakage area along the slide valve interface with the rotors. An efficiency penalty also can result from inclusion of slide valves typically because of the additional clearance from the rotors that is required. Due, in part, to the increase of the mechanical complexities associated with employing slide valve arrangements, slide valves also can contribute to manufacturability difficulties and to potential reduced reliability in day-to-day operation.

Another approach has been to employ poppets. Poppets also can serve as a mechanical unloader. Use of poppets in screw compressors suffer from similar drawbacks as slide valves. For example, poppets require additional manufacturing complexities due to increased part count and machining.

Yet another approach that has been employed to improve part-load performance is the use of variable speed drives (VSDs). VSDs control motor loading by varying the speed that a motor drives the intermeshing screw rotors. VSDs typically vary the frequency and/or voltage provided to the motor. This frequency or voltage variance can allow the motor to provide a variable output speed and power in response to the load on the motor.

Employing VSDs in conventional screw compressors can cause three to six percent or more loss in efficiency at full-load capacity. At the same time, VSDs have a cost on the order of a screw compressor. Another challenge with employing VSDs to operate conventional motors is that they reach their peak efficiency at their rated speed. As a result, motor efficiency drops at lower speeds. Such reduced theoretical performance compromises the energy savings level at part-load conditions. In an attempt to minimize the performance compromise of VSDs, gear train arrangements have been employed to optimize tip speed and rotational input into the screw compressor. Employing gear trains present challenges of their own, including gear train-related parasitic losses, added lubrication, added maintenance, more noise and larger space requirements.

Regardless of which approach is employed to achieve part-load performance, neither slide valve arrangements nor variable speed drives used in conventional screw compressors have achieved compact, variable capacity screw compressors that are operable at a rotational speed substantially above a synchronous motor rotational speed for a rated capacity of the screw compressor, where the inlet port, the discharge port, screw rotors and the selected rotational speed are configured such that the selected rotational speed drives at least one screw rotor at an optimum peripheral velocity independent of the rated capacity of the screw compressor. Nor have the conventional screw compressors delivered a variable capacity screw compressor configuration where the inlet port, the discharge port and the screw rotors are sized together with the selected rotational speed such that a plurality of screw compressors with different rated capacities can be produced, where each screw compressor delivers approximately the same high efficiency from operation of at least one screw rotor at the same optimum peripheral velocity.

BRIEF SUMMARY OF THE INVENTION

According to an embodiment of the present invention, a variable capacity screw compressor comprises a rotor housing, a motor, and a variable speed drive. The rotor housing comprises a suction port, a working chamber, a discharge port, and at least two screw rotors that comprise a female screw rotor and a male screw rotor being positioned within the working chamber for cooperatively compressing a fluid. The suction port, the at least two screw rotors and the discharge port are configured in relation to a selected rotational speed. The selected rotational speed operates at least one screw rotor at an optimum peripheral velocity that is independent of a peripheral velocity of the at least one screw rotor at a synchronous motor rotational speed for a rated screw compressor capacity. A motor is operable to drive the at least one screw rotor at a rotational speed at a full-load capacity that is substantially greater than the synchronous motor rotational speed at the rated screw compressor capacity. A variable speed drive receives a command signal from a controller and generates a control signal that drives the motor at the rotational speed.

In another embodiment, a method for sizing at least two screw compressors is provided. The target capacity for each screw compressor is selected. Each screw compressor has a different rated capacity and further comprises a suction port, a working chamber, a discharge port, and at least two screw rotors being positioned within the working chamber for cooperatively compressing a fluid. The rotational speed is selected to operate at least one screw rotor in each screw compressor at an approximately constant optimum peripheral velocity that is independent of the rated capacity of each screw compressor. The suction port, the at least two screw rotors and the discharge port are configured together with the rotational speed for each screw compressor.

In another embodiment, a refrigeration chiller, having at least one refrigeration circuit, comprises a variable capacity screw compressor, condenser, expansion valve and evaporator. The variable capacity compressor comprises a rotor housing, a motor housing and a variable speed drive. The rotor housing further comprises a suction port, a working chamber, a discharge port, and at least two screw rotors that comprise a female screw rotor and a male screw rotor being positioned within the working chamber for cooperatively compressing a fluid. The suction port, the at least two screw rotors and the discharge port are configured in relation to a selected rotational speed. The selected rotational speed provides at least one screw rotor to operate at an optimum peripheral velocity that is independent of a peripheral velocity of the at least one screw rotor at a synchronous motor rotational speed for a rated screw compressor capacity. The motor housing further comprises a motor, the motor is operable to drive the at least one screw rotor at a rotational speed at a full-load capacity that is substantially greater than the synchronous motor rotational speed at the rated screw compressor capacity. The variable speed drive is configured to receive a command signal from a controller and to generate a control signal that drives the motor at the rotational speed. A condenser is coupled to the discharge port of the variable capacity screw compressor. The condenser is configured to cool and condense fluid received from the discharge port. An expansion valve is coupled to the condenser. The expansion valve is configured to evaporate at least a portion of fluid received from the condenser by lowering pressure of fluid received from the condenser. An evaporator is coupled to the expansion valve. The evaporator is configured to evaporate fluid received from the expansion valve and to provide fluid to the suction port of the variable capacity screw compressor.

Those skilled in the art will appreciate advantages and superior features of the above embodiments, together with other important aspects thereof upon reading the detailed description which follows in conjunction with the drawings. Additional advantages and features of the invention will become more apparent from the description of an embodiment of the present invention and the claims which follow.

BRIEF DESCRIPTION OF THE SEVERAL VIEWS OF THE DRAWINGS

The following figures include like numerals indicating like features where possible.

DETAILED DESCRIPTION OF AN EMBODIMENT

Figure 1:
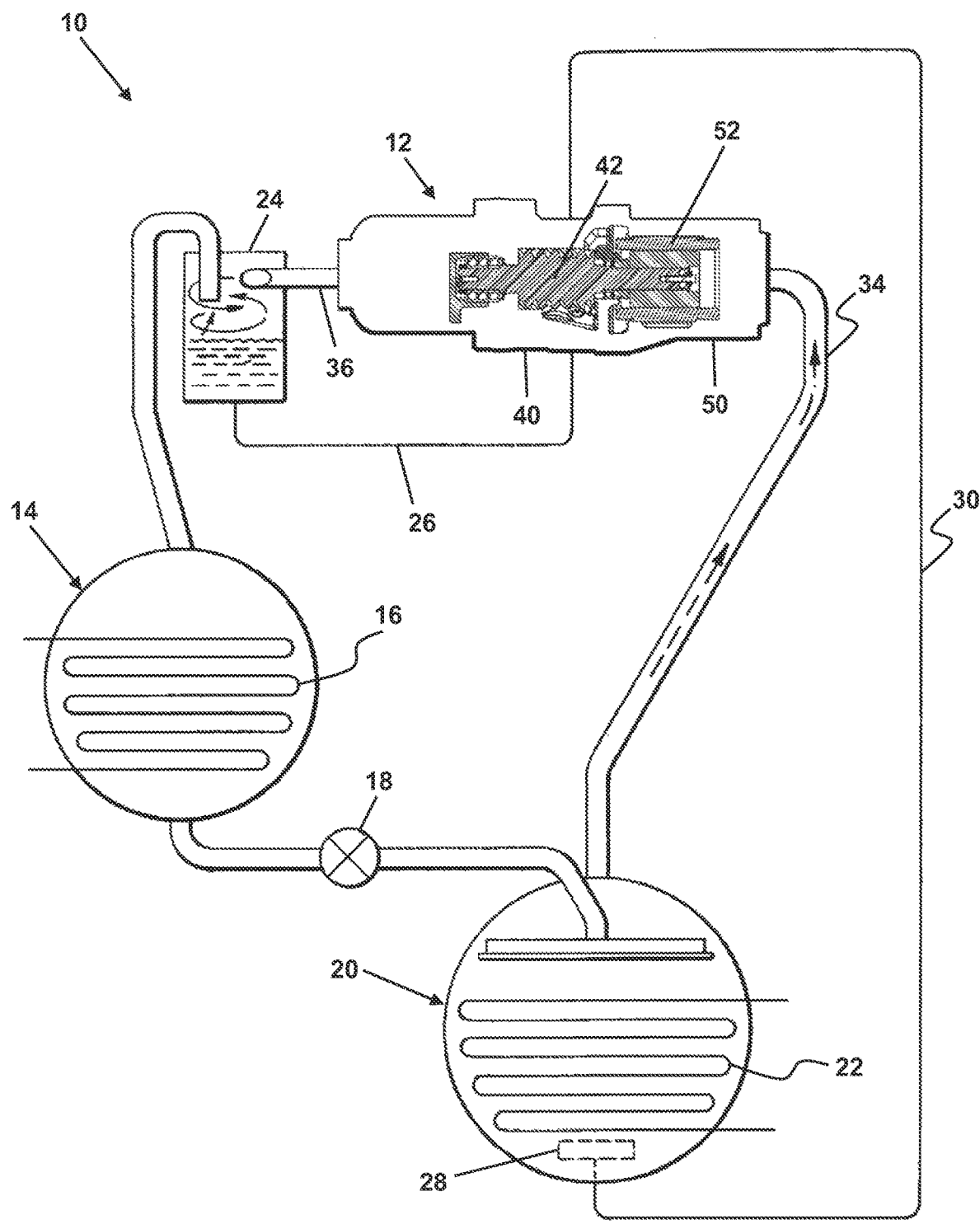
FIG. 1 illustrates an embodiment of the present invention that incorporates a screw compressor arranged as part of a refrigeration chiller system.

As a preface to the detailed description, as used in this specification and the appended claims, the singular forms "a," "an," and "the" also include plural referents, unless the context clearly dictates otherwise. References in this specification to "one embodiment," "an embodiment," "an example embodiment," etc., indicate that the described embodiment may include a particular feature, structure, or characteristic; however, every embodiment may not necessarily include the particular feature, structure, or characteristic. When a particular feature, structure, or characteristic is described in connection with an embodiment, other embodiments may incorporate or otherwise implement such feature, structure, or characteristic whether or not explicitly described.

Referring now to FIGS. 1-4, components of a chiller or chiller system 10 are illustrated. Chiller 10 includes many other conventional features not depicted for simplicity of the drawings.

Chiller system 10 is directed to refrigeration systems. Chiller 10 is in the range of about 20 to 500 tons or larger, particularly where the refrigeration system includes a multiple stage compressor arrangement. Persons of ordinary skill in this art will readily understand that embodiments and features of this invention are contemplated to include and apply to, not only single stage compressors/chillers, but also to (i) multiple stage compressors/chillers and (ii) single and/or multistage compressor/chillers operated in parallel.

As shown, chiller 10 comprises a screw compressor system 12 (also sometimes referred to as a screw compressor 12), a condenser 14, and an evaporator 20, all of which are serially connected to form a semi- or fully-hermetic, closed-loop refrigeration system. Chiller 10 may circulate a fluid 80 (such as, for example, a refrigerant) to control the temperature in a space such as a room, home, or building. The fluid 80 may be circulated to absorb and remove heat from the space and may subsequently reject the heat elsewhere.

Fluid 80 may be a refrigerant. The refrigerant may be selected from an azeotrope, a zeotrope or a mixture or blend thereof in gas, liquid or multiple phases. For example, such refrigerants may be selected from: R-123, R-134a, R-1234yf, R-410A, R-22 or R-32. Because embodiments of the present invention are not restricted to the refrigerant chosen, embodiments of the present invention are also adaptable to a wide variety of refrigerants that are emerging, such as low global warming potential (low-GWP) refrigerants.

FIG. 1 illustrates the condenser 14. Condenser 14 is shown as a shell and tube flooded-type. The condenser 14 can be arranged as a single evaporator or multiple evaporators in series or parallel, e.g. connecting a separate or multiple evaporators to each compressor. Condenser 14 may include condenser tubing 16. Fluid 80 may pass across the condenser tubing 16 through which cool air or cool liquid flows.

Condenser 14 may be fabricated from carbon steel and/or other suitable material, including copper alloy heat transfer tubing. Condenser tubing 16 can be of various diameters and thicknesses, and comprised typically of copper alloy. In addition, condenser tubing 16 may be replaceable, mechanically expanded into tube sheets and externally finned seamless tubing. Other known types of condenser 14 are contemplated.

Condenser 14 may be configured to communicate fluid 80 from a discharge passage 36. Discharge passage 36 may be configured to receive the fluid 80, or may be coupled to the condenser 14 through an oil separator 24, as depicted in FIG. 1. Other configurations are contemplated. The oil separator 24, when employed, separates oil from the fluid 80 and returns the oil via an oil supply passage 26 to the screw compressor 12 for reuse. The oil may be reused to, for example, cool the fluid 80, cool screw rotors 42, seal the interfaces between the screw rotors 42 themselves, seal the interfaces between the screw rotors 42 and the walls of a working chamber 44, and/or lubricate bearings 46, 48.

Condenser 14 may transform the fluid 80 from a superheated vapor to a saturated liquid. As a result of the cool air or cool liquid passing across the condenser tubing 16, fluid 80 may reject or otherwise deliver heat from the chiller 10 to another fluid, like air or liquid, in a heat transfer relation, which in turn carries the heat out of the system.

An expansion valve 18 may be employed, as shown in FIG. 1. Expansion valve 18 may be configured to receive fluid 80 from condenser 14. Fluid 80 received from condenser 14 typically is in a thermodynamic state known as a saturated liquid. The expansion valve 18 may abruptly reduce the pressure of the fluid 80. The abrupt pressure reduction may cause adiabatic flash evaporation of at least a portion of the fluid 80. In particular, the adiabatic flash evaporation may result in a liquid and vapor mixture of the fluid 80 that has a temperature that is colder than the temperature of the space to be cooled.

Evaporator 20 is shown in FIG. 1 as a shell and tube flooded-type. The evaporator 20 can be arranged as a single evaporator or multiple evaporators in series or parallel, e.g. connecting a separate or multiple evaporators to each compressor. Evaporator 20 may include evaporator tubing 22. Fluid 80 may pass across the evaporator tubing 22 through which cool air or cool liquid flows.

Evaporator 20 may be fabricated from carbon steel and/or other suitable material, including copper alloy heat transfer tubing. Evaporator tubing 22 can be of various diameters and thicknesses, and comprised typically of copper alloy. In addition, evaporator tubing 22 may be replaceable, mechanically expanded into tube sheets and externally finned seamless tubing. Other known types of evaporator 20 are contemplated.

Evaporator 20 is configured, as illustrated in FIG. 1, to receive fluid 80 communicated from the expansion valve 18. Fluid 80 received by the evaporator 20 in the refrigeration loop may be relatively colder than it was when discharged from the screw compressor 12. The oil return apparatus 28, when employed, separates oil from the fluid 80 and returns the oil via an oil return passage 30 to the screw compressor 12 for reuse. The oil may be reused to, for example, cool the fluid 80, cool screw rotors 42, seal the interfaces between the screw rotors 42 themselves, seal the interfaces between the screw rotors 42 and the walls of a working chamber 44, and/or lubricate the bearings 46, 48.

The evaporator 20 may absorb and remove heat from the space to be cooled, and the condenser 14 may subsequently reject the absorbed heat to air or liquid that carries the heat away from the space to be cooled. In operation, warm air or liquid may be circulated from the space to be cooled across the evaporator tubing 22. The warm air or liquid passing across the evaporator tubing 22 may cause a liquid portion of the cold fluid 80 to evaporate. At the same time, the warm air or liquid passed across the evaporator tubing 22 may be cooled by the fluid 80. It should be understood that any configuration of the condenser 14 and/or evaporator 20 may be employed that accomplishes the necessary phase changes of fluid 80.

The chilled or heated water is pumped from the evaporator 20 to an air handling unit (not shown). Air from the space that is being temperature conditioned is drawn across coils in the air handling unit that contains, in the case of air conditioning, chilled water. The drawn-in air is cooled. The cool air is then forced through the air conditioned space, which cools the space.

Additionally, though not shown, an economizer 32 may be incorporated to include an economizer cycle. Economizer 32 or a subcooling cycle (not shown), or both, may be employed in the refrigeration cycle and return the fluid 80 to the screw compressor 12 via suction passage 34 or other passage (not shown) depending on the configuration required the application conditions.

Figure 2:
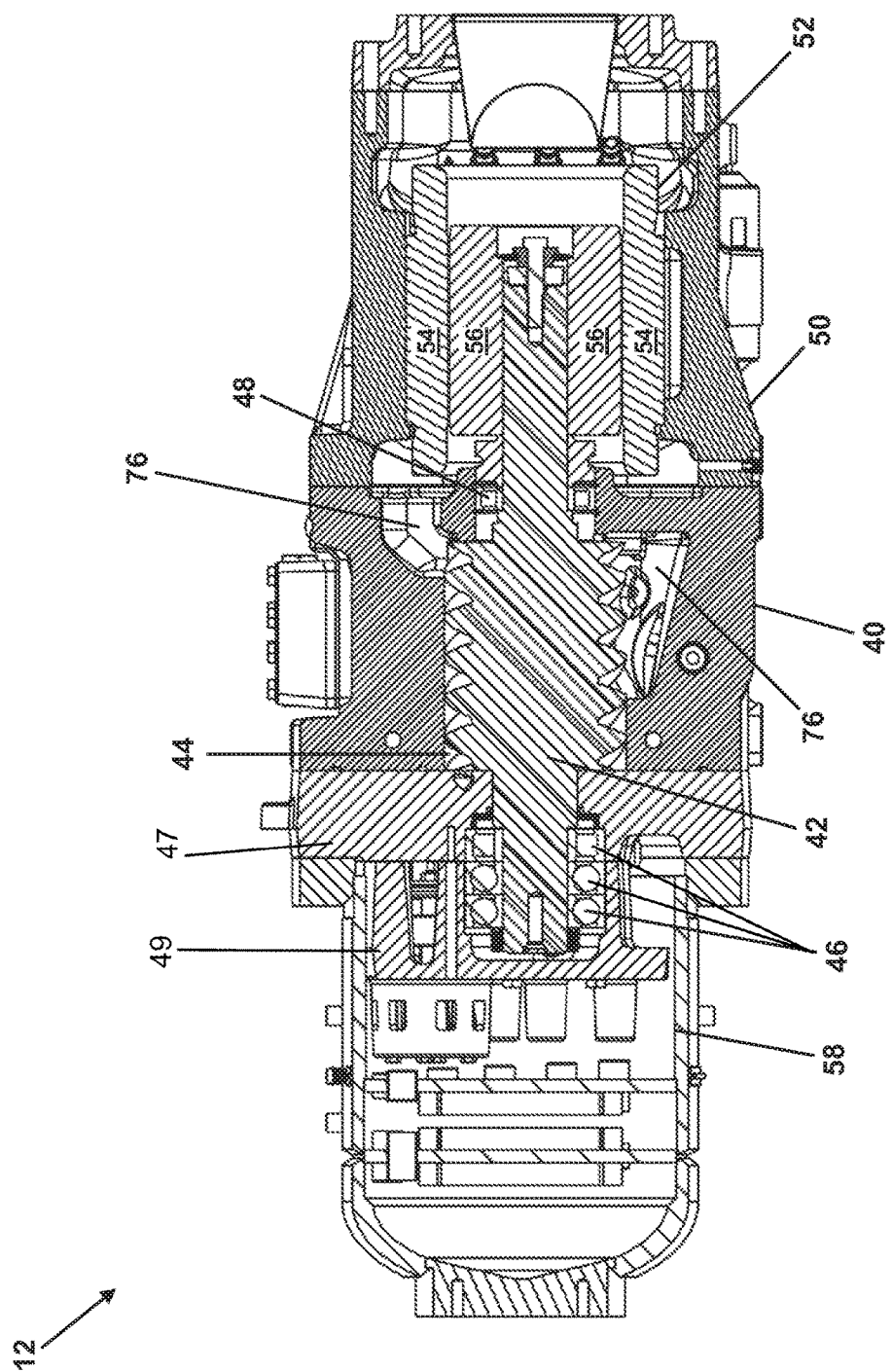
FIG. 2 illustrates a cross sectional view of a screw compressor according to an embodiment of the present invention.
Figure 3:
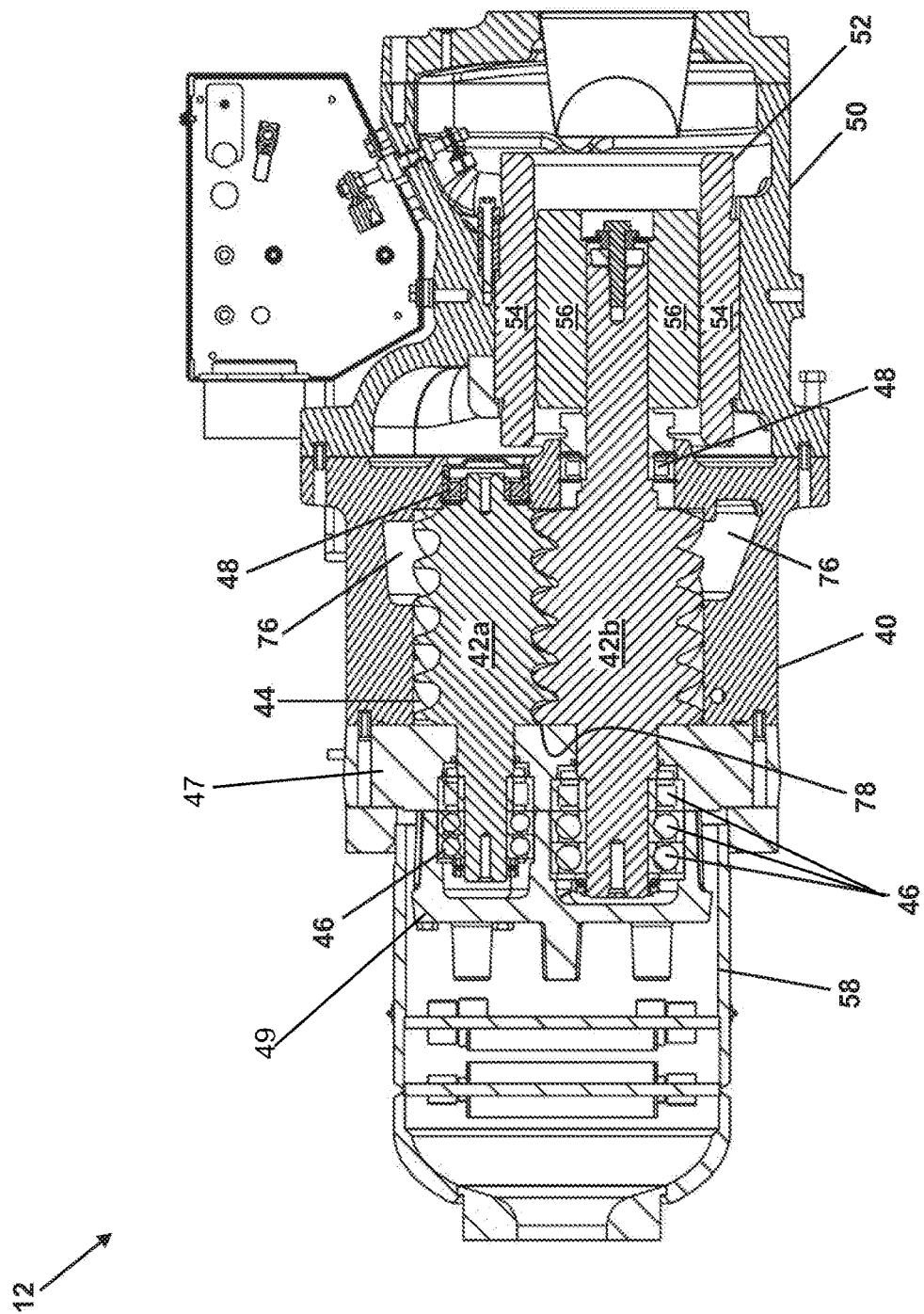
FIG. 3 illustrates an additional cross sectional view of a screw compressor according to an embodiment of the present invention.

Referring to FIGS. 2 and 3, screw compressor 12 typically comprises a rotor housing 40 and an electric motor housing 50. Screw compressor 12 may be formed, all or in part, of gray cast iron, for example. Other materials may be used to form the screw compressor 12. Screw compressor 12, according to embodiments of the present invention, facilitates highly efficient operation at full-load and part-load conditions over a preselected screw capacity range.

Motor housing 50 houses a motor 52 in an embodiment of the present invention. Electric motor 52 may coupled to a variable frequency drive 38. The electric motor 52 drives meshed screw rotors 42. Motor housing 50 may be integral to the rotor housing 40.

The rotor housing 40 may have a low pressure end and a high pressure end that each contain a suction port 76 and discharge port 78, respectively. Suction port 76 and discharge port 78 are in open-flow communication with the working chamber 44. The suction port 76 and the discharge port 78 may each be an axial, a radial or a mixed (a combination of a radial and an axial) port.

The suction port 76 may receive the fluid 80 at a suction pressure and a suction temperature. The suction port 76 may receive fluid 80 from suction passage 34 in thermodynamic states known as a saturated vapor or a superheated vapor. The screw compressor 12 may compress the fluid 80 as the screw compressor 12 communicates the fluid 80 from the suction port 76 to the discharge port 78. Fluid 80 passing through the discharge port 78 discharges into discharge passage 36.

Compressing the fluid 80 may also result in the fluid 80 being discharged at a discharge temperature that is higher than the suction temperature. The fluid 80 discharged from the discharge port 78 may be in a thermodynamic state known as a superheated vapor. Accordingly, fluid 80 discharged from the screw compressor 12 may be at a temperature and a pressure at which the fluid 80 may be readily condensed with a cooling air or a cooling liquid.

Suction port 76 and discharge port 78 are configured to minimize flow losses, when at least one of the rotors 42 is operated at an approximately constant peripheral velocity. The suction port 76 may be located where fluid 80 exits the suction area of screw compressor 12 and is drawn into the working chamber 44. The suction port 76 may be sized to be as large as possible to minimize, at least, the approach velocity of the fluid 80. The location of the suction port 76 in the rotor housing 40 also may be configured to minimize turbulence of fluid 80 prior to entry into the rotors 42.

Discharge port 78 may be sized larger than theoretically necessary to provide a thermodynamic optimum size and thereby, reduce the velocity at which the fluid 80 exits the working chamber 44. The discharge port 78 may be generally located where fluid 80 exits the working chamber 44 of screw compressor 12. The discharge port 78 location in the rotor housing 40 may be configured such that the maximum discharge pressure can be attained in the rotors 42 prior to being delivered into the discharge passage 36. In addition, screw compressor 12 may incorporate a muffler 58 or other apparatus suitable for noise reduction.

Referring again to FIG. 3, rotors 42 are mounted for rotation in a working chamber 44. The working chamber 44 comprises a volume that is shaped as a pair of parallel, intersecting flat-ended cylinders, and is closely toleranced to the exterior dimensions and geometry of the intermeshed screw rotors 42. The plurality of meshed screw rotors 42a, 42b may define one or more compression pockets between the screw rotors 42a, 42b and the interior chamber walls of the rotor housing 40. The rotor housing 40 has little separation from the rotors 42. Milling, machine grinding or molding can be employed to achieve high accuracy and tight tolerances between rotors 42 flutes and lobes and the rotor housing 40.

First screw rotor 42a and second screw rotor 42b are disposed in a counter-rotating, intermeshed relationship and cooperate to compress a fluid. At least one of rotors 42 is cooperatively configured with motor 52 to be operable at a rotational speed for a screw compressor capacity within a preselected screw compressor capacity range. The selected rotational speed at full-load capacity is substantially greater than a synchronous motor rotational speed at a rated capacity (also referred to herein as rated screw compressor capacity) for screw compressor 12.

In the embodiment illustrated, rotor 42a may be called a female screw rotor and comprise a female lobed/fluted body or working portion (typically a helical or spiral extending land and groove). Rotor 42b may be called a male screw rotor and comprise a male lobed/fluted body or working portion (typically a helical or spiral extending land and groove).

Rotors 42 include shaft portions, which are, in turn, mounted to the housing of screw compressor 12 by, for example, one or more bearings 46, 48. The exemplary bearings 46, 48 will also be configured with tight clearances in relation to at least rotors 42 and rotor housing 40. A first of the one or more bearings 46 is supported by a bearing housing 47. A second of the one or more bearings 46 is supported by a bearing cover 49. The bearing housing 47 is disposed physically between the rotor housing 40 and the bearing cover 49 in an axial direction of the rotors 42.

Compression of the fluid 80 in screw compressor 12 produces axial and radial forces. The configurations of embodiments of the present invention may also mitigate time varying and non-uniform rotor movements and forces against chamber walls, bearings, and end surfaces of the screw compressor 12 caused by the interaction of the screw rotors 42a, 42b, the axial forces, and the radial forces.

As mentioned, a lubricating fluid, typically oil, may be delivered from oil supply passage 26 or oil return passage 30 to the screw compressor 12. The lubricating fluid provides cushioning films for the walls of the working chamber 44, rotors 42a, 42b, and bearings 46, 48 of the screw compressor 12, but does little to prevent the transmission of the time varying and non-uniform axial and radial forces. The screw compressor 12 may also utilize an expander (not shown), which may also be integral to screw compressor 12, to recover energy available from the refrigeration cycle as the high pressure liquid expands through the expander to a lower pressure.

The electric motor 52 in one exemplary embodiment may drive at least one of the rotors 42 in response to command signals 62 received from the controller 60. The horsepower of preferred motor 52 can vary in the range of about 125 horsepower to about 2500 horsepower. Torque supplied by the electric motor 52 may directly rotate at least one of the screw rotors 42. Employing motor 52 and variable speed drive 38, screw compressor 12 of embodiments of the present invention may have a rated screw compressor capacity within the range of about 35-tons to about 150-tons or more and have a full-load speed range within about 4,000 revolutions per minute to about 15,000 revolutions per minute, when the fluid is an R-134a refrigerant.

While conventional types of motors, like induction motors, can be used with and will provide a benefit when employed with embodiments of the present invention, a preferred motor 52 comprises a direct drive, variable speed, hermetic, permanent magnet motor. Permanent magnet motor 52 can increase system efficiencies over other motor types. The choice of motor 52 may be affected by cost and performance considerations.

Referring to FIGS. 2 and 3, the permanent magnet motor 52 comprises a motor stator 54 and a motor rotor 56. Stator 54 consists of wire coils formed around laminated steel poles, which convert variable speed drive 38 applied currents into a rotating magnetic field. The stator 54 is mounted in a fixed position in the screw compressor 12 and surrounds the motor rotor 56, enveloping the rotor 56 with the rotating magnetic field. Motor rotor 56 is the rotating component of the motor 52 and may consist of a steel structure with permanent magnets, which provides a magnetic field that interacts with the rotating stator magnetic field to produce rotor torque. In addition, permanent magnet motor 52 may be configured to receive variable frequency control signals and to drive the at least two screw rotors per the received variable frequency control signals.

The motor rotor 56 may have a plurality of magnets and may comprise magnets buried within the rotor steel structure or be mounted at the rotor steel structure surface. Motor rotor 56 surface mount magnets are secured with a low loss filament, metal retaining sleeve or by other means to the rotor steel support. Further manufacturing, performance, and operating advantages and disadvantages can be realized with the number and placement of permanent magnets in the motor rotor 56. For example, surface mounted magnets can be used to realize greater motor efficiencies due to the absence of magnetic losses in intervening material, ease of manufacture in the creation of precise magnetic fields, and effective use of rotor fields to produce responsive rotor torque. Likewise, buried magnets can be used to realize a simpler manufactured assembly and to control the starting and operating rotor torque reactions to load variations.

The performance and size of the permanent magnet motor 52 is due in part to the use of high energy density permanent magnets. Permanent magnets produced using high energy density magnetic materials, typically at least 20 MGOe (Mega Gauss Oersted), produce a strong, more intense magnetic field than conventional materials. With a motor rotor 56 that has a stronger magnetic field, greater torques can be produced, and the resulting motor 52 can produce a greater horsepower output per unit volume than a conventional motor, including induction motors. By way of comparison, the torque per unit volume of permanent magnet motor 52 can be at least about 75 percent higher than the torque per unit volume of induction motors used in refrigeration chillers of comparable refrigeration capacity. The result is a smaller sized motor to meet the required horsepower for a specific compressor assembly.

The permanent magnet motor 52 of an embodiment of the present invention is compact, efficient, reliable, and relatively quieter than conventional motors. As the physical size of the screw compressor 12 is reduced, motor 52 used can be scaled in size to fully realize the benefits of improved fluid flow paths and compressor element shape and size. Motor 52 is reduced in volume by approximately 30 percent or more, when compared to conventional existing designs for compressor assemblies that employ induction motors and have refrigeration capacities in excess of 35-tons. The resulting size reduction of embodiments of the present invention provides a greater opportunity for efficiency, reliability, and quiet operation through use of less material and smaller dimensions than has been achieved through more conventional practices.

Any bearings employed with motor 52 may be rolling element bearings (REB) or hydrodynamic journal bearings. Such bearings may be oil lubricated. Oil-free bearing systems may be employed. A special class of bearing which is refrigerant lubricated is a foil bearing and another bearing type uses REB with ceramic balls. Each bearing type has advantages and disadvantages that should be apparent to those of skill in the art. Bearings should be selected to facilitate highly efficient operation of the screw compressor 12 at reduced speeds for capacity modulation and to minimize rotor dynamics and vibration associated with reduced speeds. Any bearing type may be employed that is suitable of sustaining rotational speeds in the range of about 2,000 RPM to about 20,000 RPM.

The motor rotor 56 and motor stator 54 end turn losses for the permanent magnet motor 52 are very low compared to some conventional motors, including induction motors. The motor 52, therefore, may be cooled by means of fluid 80 (typically, refrigerant). When fluid 80 is employed for cooling motor 52, fluid 80 may only need to contact the outside diameter of the stator 54. Cooling the motor 52 in this way allows for the elimination of the motor cooling feed ring that is typically used in induction motor stators. Alternatively, refrigerant may be metered to the outside surface of the stator 54 and to the end turns of the stator 54 to cool the motor 52.

In addition, the torque that is needed from motor 52 comes essentially from the internal pressure distribution in the rotors 42, which is a function of rotors 42 geometry and the operating conditions. That internal pressure distribution within the rotors 42 provides the load against which the motor 52 has to work. Employing embodiments of this invention without a mechanical unloader results in a theoretical torque that may be essentially constant over a full range of operating conditions, and for a given operating condition, a ratio of theoretical to actual torque on the motor 52 that may be approximately constant, despite decay in the actual torque during operation due to changing losses and leakage, for example. In contrast, for a given operating condition, conventional screw compressors invoking a mechanical unloader will have significant torque fluctuations or variations over time.

Figure 4:
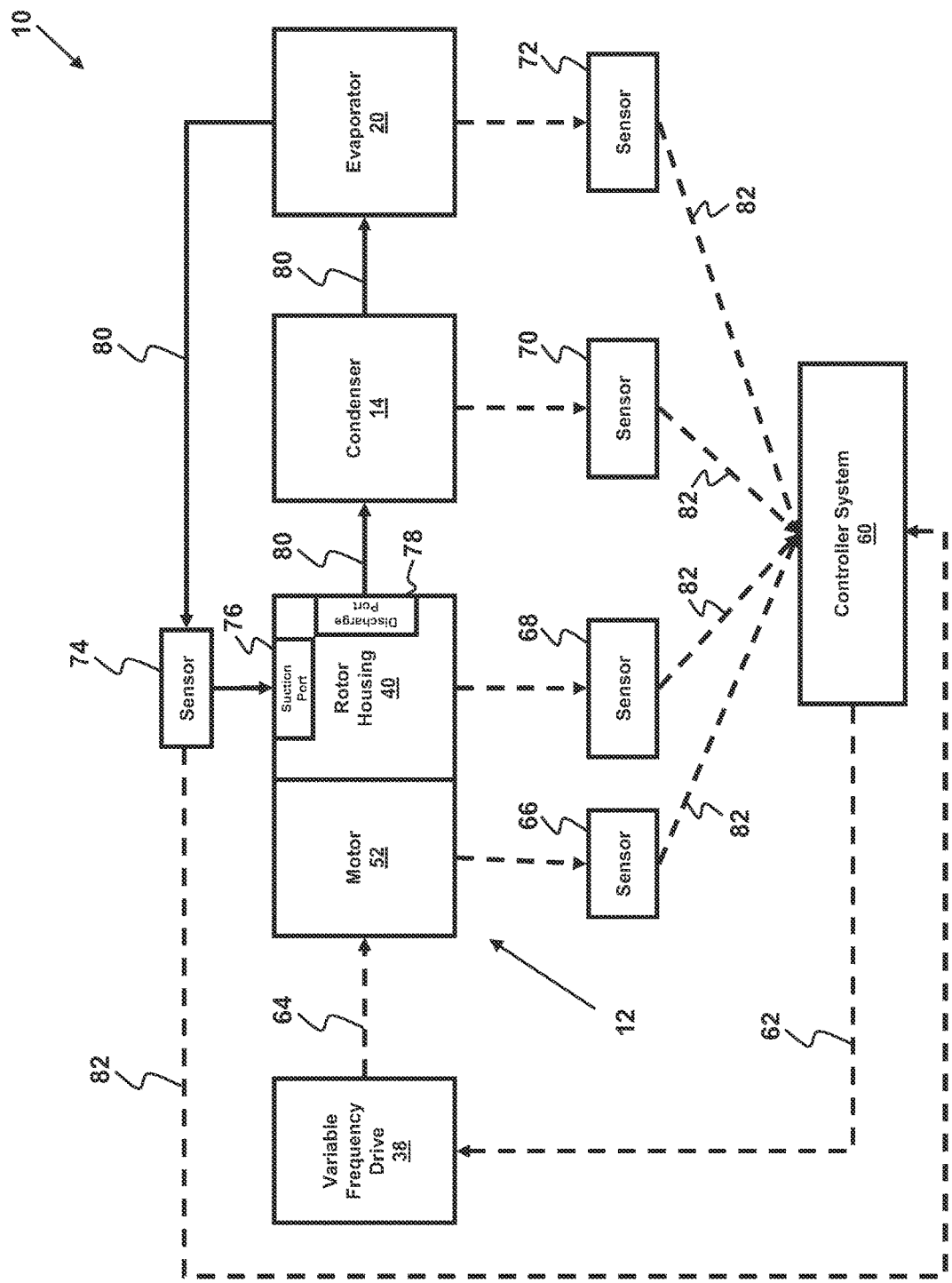
FIG. 4 illustrates an embodiment of a refrigeration chiller and controller system according to an embodiment of the present invention.

As illustrated in FIG. 4, a variable speed drive 38 may drive the motor 52 and in turn, screw compressor 12. The speed of the motor 52 can be controlled by varying, for example, the frequency of the electric power that is supplied to the motor 52. Use of a permanent magnet motor 52 and variable speed drive 38 moves some conventional motor losses outside of the refrigerant loop. The efficiency of the variable speed drive 38, line input to motor shaft output, preferably can achieve a minimum of about 95 percent over the system operating range.

The variable speed drive 38 drives the screw compressor 12 at the optimum, or near optimum, rotational speed at each capacity over the preselected screw compressor capacity range for a screw compressor 12 of a given rated capacity. The variable speed drive 38 may be refrigerant cooled, water cooled or air cooled. As mentioned, similar to cooling of motor 52, the variable speed drive 38, or portions thereof, may be by using a refrigerant circulated within the chiller system 10 or by other conventional cooling means. How the motor 52 and/or variable speed drive 38 are cooled should be understood as dependent on the operational and environmental conditions in which the motor 52 and/or variable speed drive 38 reside in operation.

The variable speed drive 38 typically will comprise an electrical power converter comprising a line rectifier and line electrical current harmonic reducer, power circuits and control circuits (such circuits further comprising all communication and control logic, including electronic power switching circuits). Conditions in which the screw compressor 12 is employed may justify employing more than one variable speed drive 38 for chiller 10.

The variable speed drive 38 can be configured to receive command signals 62 from a controller 60 and to generate a control signal 64. The variable speed drive 38 will respond, for example, to signals 62 received from a microprocessor (also not shown) associated with controller system 60 to increase or decrease the speed of the motor 52 by changing the frequency of the current supplied to motor 52. Controller 60 may be configured to receive status signals 82 indicative of an operating point of the screw compressor, and to generate command signals that requests the electric motor system to drive the screw compressor per a preselected operating parameter. Status signals 82 may deliver similar or different status information depending, for example, on the intended purpose of the sensor selected. Controller 60 may generate command signals 62 per a preselected operating parameter, like a torque profile for screw compressor 12. Control signal 64 can drive the high energy density motor 52 at a rotational speed substantially greater than a synchronous motor rotational speed for the rated screw compressor capacity and drive the motor 52, and in turn at least one screw rotor 42, at an optimum peripheral velocity independent of the rated screw compressor capacity.

The motor 52 and the variable speed drive 38 have power electronics for low voltage (less than about 600 volts), 50 Hz and 60 Hz applications. Typically, an AC power source (not shown) will supply multiphase voltage and frequency to the variable speed drive 38. The AC voltage or line voltage delivered to the variable speed drive 38 will typically have nominal values of 200V, 230V, 380V, 415V, 480V, or 600V at a line frequency of 50 Hz or 60 Hz depending on the AC power source.

By the use of motor 52 and variable speed drive 38, the speed of motor 52 can be varied to match varying system requirements. Speed matching results in approximately 30 percent more efficient system operation compared to a compressor without a variable speed drive 38. By running compressor 12 at lower speeds when the load on the chiller is not high or at its maximum, sufficient refrigeration effect can be provided to cool the reduced heat load in a manner which saves energy, makes the chiller 10 more economical from a cost-to-run standpoint, and facilitates highly efficient chiller 10 operation as compared to chillers which are incapable of such load matching at the rotational speeds possible via embodiments of the present invention. For example, a rated screw compressor capacity of about 100-tons configured according to embodiments of the present invention could be efficiently operable over a preselected screw capacity range of about 75-tons to about 125-tons.

Screw compressor 12 can be operated at rotational speeds substantially higher than synchronous motor rotational speeds for a given rated capacity of the screw compressor 12. The specific optimum speed for the rated screw compressor capacity range is a function of screw compressor capacity and head pressure. Embodiments of the present invention dramatically improve the discharge porting of fluid 80 and in turn, allow for screw compressor 12 to be operated at a significantly increased rotational speed over the rotational speed that gives the best performance for conventionally sized rotors and ports. For example, the selected rotational speed for a rated screw compressor capacity of about 100-tons, according to embodiments of the present invention, is about 5800 revolutions per minute, when the fluid is an R-134a refrigerant. In contrast, a conventional screw compressor with a rated capacity of about 100-tons has a synchronous motor rotational speed is about 3400 revolutions per minute, when the fluid is an R-134a refrigerant.

The allowable range of rotational speed for a particular rated capacity of a screw compressor 12 is selected to achieve an optimum peripheral velocity of at least one of the screw rotors independent of the rated capacity of screw compressor 12 that results in a relatively uniform high efficiency across the screw compressor product family (e.g. 60-tons, 80-tons, 100-tons and 150-tons.) The optimum peripheral velocity is a constant product of the rotational speed and the radius of at least one of the rotors 42, typically, the male rotor 42b. The approximately constant optimum peripheral velocity is, for example, in the range between about 131 feet per second (about 40 meters per second) to about 164 feet per second (about 50 meters per second). In one embodiment, the approximately constant optimum peripheral velocity is between about 42 meters per second (about 137 feet per second) to about 45 meters per second (about 147 feet per second) in high pressure applications, when R-134a refrigerant is the fluid 80. Persons of skill in the art would understand that, for a low pressure application or for a different primary fluid 80, or both, the optimum peripheral velocity may be different.

The rotational speed of the motor 52 may be selected in combination with configuring rotors 42, suction port 76 and discharge port 78 for each target capacity to achieve an approximately constant optimum peripheral velocity of at least one of the screw rotors 42 regardless of the rated capacity of the screw compressor 12. That is, specific combinations of screw rotors 42, inlet port 76, discharge port 78 and the operational rotational speed are selected such that each specific combination enables each screw compressor 12 to run at approximately the same optimum peripheral velocity for each different rated capacity and, in turn, to produce relatively the same high efficiency between or among each different rated capacity of screw compressor 12.

Embodiments of the present invention include a method of sizing of at least two screw compressors 12 with different rated capacities that achieve approximately constant efficiency across the screw compressor product family (e.g. 60-tons, 80-tons, 100-tons and 150-tons). By employing embodiments of this invention, the isoentropic efficiency versus capacity (in tons) of screw compressor 12 is significantly increased, on the order of 15 percent, over a conventional screw compressor. In addition, because screw compressor 12 is operated at relatively higher speed, the screw compressor 12 can slowed down on the order of 20-30 percent of the speed for the operating capacity and still have an approximately constant peak efficiency or efficiency plateau as compared to the efficiency at the rated screw compressor capacity.

The target capacity for each screw compressor 12, each having a different rated capacity, is selected. The rotational speed is also selected based on the target capacity of each screw compressor 12 to operate at least one screw rotor 42 in each screw compressor 12 at an approximately constant optimum peripheral velocity that is independent of the rated capacity of each screw compressor 12. The suction port 76, the at least two screw rotors 42 and the discharge port 78 are configured together with the rotational speed selected for each screw compressor 12.

Specifically, driving screw compressor 12 at an optimum peripheral velocity allows for each rotor 42 to have a geometry and a profile that may remain the same for a wide range of preselected screw compressor capacities for the rated screw compressor capacity. Each of the rotors 42, though, may have a different geometry and a profile for each different rated screw compressor capacity that will enable at least one screw rotor to be operated at a selected rotational speed that produces an approximately constant optimum peripheral velocity between or among each rated capacity of each screw compressor 12. The volumetric ratio of the screw compressor 12 is selected as a function of the loading conditions in which the screw compressor 12 will be used. By way of example, in embodiments of the present invention, more than two volumetric ratios, potentially four, five or more, are contemplated over a range of rated screw compressor capacities. The volumetric ratio may also be such that the system compression ratio and the internal compression ratio closely match. The rotor 42 profile may be a balance of the length of the sealing line, flow cross sectional area and blow-hole area size.

The geometry and profile are generally defined, in part, by the number of lobes in each rotor, the wrap angle, the length of the rotors and the diameter of the rotors, for example. Screw rotor 42 has a profile taken in a plane transverse to the parallel axes of the male rotor 42b and the female rotor 42a. The profile of rotors 42 can be symmetric or asymmetric, and circular, elliptical, parabolic, hyperbolic, for example. Rack generation of rotors 42 profile may be employed. Selecting a profile of rotors 42 is a balance of the internal leakage path of fluid 80 during operation of screw compressor 12 and the porting configuration of suction port 76 and discharge port 78, such that screw compressor 12 has an approximately constant optimum peripheral velocity.

More specifically, for example, at an about 44 m/s optimum peripheral velocity for at least one rotor 42 of a 100-ton screw compressor, the resulting male rotor 42b has a wrap angle of about 347 degrees and the female rotor 42a has a wrap angle that is $6/7$ths of the male rotor 42b. The wrap angle of the female rotor 42a varies with the ratio of number of lobes. The female rotor 42a has a radius of about 2.5 inches (6.35 centimeters) and 7 lobes and the male rotor 42b has a radius of about 3 inches (7.62 centimeters) and 6 lobes. The length of rotors 42 is significantly smaller, on the order of about 20-30 percent smaller, than a conventionally sized screw compressor at the rated screw compressor capacity. A person of skill in the art will appreciate that analytical techniques can be employed for other combinations of rotor 42 profiles for a given rated screw compressor capacity within the scope of the present invention.

Employing a geometry/profile of rotors 42 for a screw compressor 12 having a preselected screw compressor range and operable at an approximately constant optimum peripheral velocity, allows for operation of the screw compressor 12 at 25 or more percent less than the rated screw compressor capacity without significant adverse rotor dynamic effects. Screw compressor 12 has an improved rotor profile that maximizes internal flow area, internal friction due to relative motion of the rotor 42 surfaces is minimized, and leakage paths are reduced. This reduced leakage and higher flow tend to increase the screw compressor 12 efficiency and reduce power wasted, which increases overall efficiency.

Referring now to FIG. 4, further details regarding an embodiment of the chiller 10 are presented. In particular, chiller 10 may include a controller or controller system 60. Controller 60 may be arranged to communicate with the variable frequency drive 38, screw compressor 12, condenser 14 and evaporator 20. Chiller 10 may further include one or more sensors. Sensors 66, 68, 70, 72 and 74, for example, may be employed to sense and/or communicate torque, suction pressure and/or temperature, discharge pressure and/or temperature, and/or other measurable parameter. Other sensors could be employed depending on the application in which screw compressor 12 is used. Signals 82 may be communicated via wiring, fiber optics, wireless and/or a combination of wiring, fiber optics and wireless. The sensors 66, 68, 70, 72 and 74 communicate status signals 82 to controller 60 with data that are indicative of the operation of various components of the chiller 10.

The controller 60 may include processors, microcontrollers, analog circuitry, digital circuitry, firmware, and/or software (not shown) that cooperate to ultimately control operation of the screw compressor 12. The memory may comprise non-volatile memory devices such as flash memory devices, read only memory (ROM) devices, electrically erasable/programmable ROM devices, and/or battery backed random access memory (RAM) devices to store an array of performance related characteristics for the screw compressor 12. The memory may further include instructions which the controller 60 may execute in order to control the operation of the screw compressor 12.

The controller 60 may receive status signals from one or more sensors 66, 68, 70, 72 and 74 that provide information regarding operation of the screw compressor 12. Based upon the status signals, the controller 60 may determine an operating mode and/or operating point of the screw compressor 12 and may generate, based upon the determined operating mode and/or operating point, one or more command signals 62 to adjust the operation of the screw compressor 12. The controller 60 may then generate command signals 62 that request the motor 52 to operate according to a preselected operating parameter(s) (e.g. a torque profile). For example, the controller 60 may enable operation at an optimal torque and speed of screw compressor 12 to minimize losses, mechanical wear and losses. Further disclosure of a controller system 60 suitable for use with embodiments of the present invention may be found in co-pending application U.S. patent Ser. No. 12/544,582, assigned to the assignee of the instant application, which is hereby incorporated by reference.

It should be apparent that variations on the control system 60 described above will be apparent to those skilled in the art. The control system 60 may be implemented with electronic digital, analog, or a combination of digital/analog control elements and low-voltage wiring. Other conventional pneumatic tubing, transmitters, controllers, and relays are contemplated.

In addition, it also will be readily apparent to one of ordinary skill in the art that the compressor system disclosed can be readily implemented in other contexts at varying scales. Use of various motor types, drive mechanisms, and configurations with embodiments of this invention should be readily apparent to those of ordinary skill in the art.

Employing embodiments of the present invention, as compared to conventional approaches, increase full-load efficiency, yield higher part-load efficiency and have a practically constant efficiency over a given capacity range, controlled independently of power supply frequency or voltage changes. Also, an advantage of embodiments of the present invention is that screw compressors 12 of different rated capacity can each have a variable capacity and still have the approximately same the level of efficiency and without mechanical unloading.

Additional advantages include a reduction in the physical size of the screw compressor and chiller system arrangement, improved scalability of the screw compressors throughout the operating range and a reduction in total sound levels. Employing embodiments of screw compressor 12 can also effectively reduce costs for the manufacturer, because it allows for one screw compressor at a rated screw compressor capacity (e.g. 100-tons) to serve as an efficient screw compressor at a range of preselected screw compressor capacity range (e.g. 80 tons and 125 tons) without the need for multiple other screw compressors to be manufactured at each additional target capacity within the preselected screw compressor rated capacity range. Practically, embodiments of the present invention also allow for lower physical part count and inventory for a product family with no loss in capacity or performance due to power supply because, for a given rated capacity of screw compressor (e.g. 100-tons), the screw compressor 12 at 50 Hertz and 60 Hertz are nearly identical.

The patentable scope of the invention is defined by the claims as described by the above description. While particular features, embodiments, and applications of the present invention have been shown and described, including the best mode, other features, embodiments or applications may be understood by one of ordinary skill in the art to also be within the scope of this invention. It is therefore contemplated that the claims will cover such other features, embodiments or applications and incorporates those features which come within the spirit and scope of the invention.

What is claimed is:

1. A variable capacity screw compressor comprising:
a rotor housing comprising:
a suction port, a working chamber, a discharge port, and at least two screw rotors that include a female screw rotor and a male screw rotor being positioned within the working chamber for cooperatively compressing a fluid;
one or more first bearings positioned close to the discharge port, wherein the one or more first bearings are configured to withstand radial forces in operation;
one or more second bearings positioned close to the discharge port and abutting the one or more first bearings, wherein the one or more second bearings are configured to withstand axial forces in operation;
a bearing housing, wherein of the one or more first bearings and the one or more second bearings, the bearing housing is configured to directly support only the one or more first bearings;
a bearing cover, wherein of the one or more first bearings and the one or more second bearings, the bearing cover is configured to directly support only the one or more second bearings, the bearing housing being disposed physically between the rotor housing and the bearing cover;
wherein the suction port, the at least two screw rotors, and the discharge port are sized in relation to a selected rotational speed, the selected rotational speed having an optimum peripheral velocity that is independent of a peripheral velocity of the at least one screw rotor at a synchronous motor rotational speed for a rated screw compressor capacity, the optimum peripheral velocity is a constant product including the selected rotational speed and a radius of the at least one screw rotor of the at least two screw rotors;
a permanent magnet motor configured to drive the at least one screw rotor at the selected rotational speed when the compressor is operated at a full-load capacity, the selected rotational speed being greater than the synchronous motor rotational speed at the rated screw compressor capacity; and a variable speed drive configured to receive a command signal from a controller and to generate a control signal that drives the motor at the selected rotational speed,
wherein the suction port is sized and located to provide a reduced approach velocity and reduce turbulence for the fluid entering the working chamber, the discharge port is sized larger than theoretically necessary to provide a thermodynamic optimum size, and the suction port and the discharge port are configured to reduce a flow loss.

2. A screw compressor comprising:
a chamber including: a suction port and a discharge port;
at least two screw rotors positioned in the chamber, the at least two screw rotors configured to compress a fluid between the suction port and the discharge port;
wherein the suction port, the at least two screw rotors, and the discharge port are sized in relation to a selected rotational speed, the selected rotational speed having an optimum peripheral velocity that is independent of a peripheral velocity of the at least one screw rotor at a synchronous motor rotational speed for a rated screw compressor capacity, the optimum peripheral velocity is a constant product including the selected rotational speed and a radius of the at least one screw rotor of the at least two screw rotors;
wherein the suction port is sized and located to provide a reduced approach velocity and reduce turbulence for the fluid entering the chamber, the discharge port is sized larger than theoretically necessary to provide a thermodynamic optimum size, and the suction port and the discharge port are configured to reduce a flow loss;
one or more first bearings positioned close to the discharge port, wherein the one or more first bearings are configured to withstand radial forces in operation; one or more second bearings positioned close to the discharge port and abutting the one or more first bearings, wherein the one or more second bearings are configured to withstand axial forces in operation; a bearing housing, wherein of the one or more first bearings and the one or more second bearings, the bearing housing is configured to directly support only the one or more first bearings; a bearing cover, wherein of the one or more first bearings and the one or more second bearings, the bearing cover is configured to directly support only the one or more second bearings, the bearing housing being disposed physically between the chamber and the bearing cover, and
a muffler, wherein the bearing cover being disposed within the muffler.

3. A screw compressor comprising:
a chamber including: a suction port and a discharge port;
at least two screw rotors positioned in the chamber, the at least two screw rotors configured to compress a fluid between the suction port and the discharge port;
wherein the suction port, the at least two screw rotors, and the discharge port are sized in relation to a selected rotational speed, the selected rotational speed having an optimum peripheral velocity that is independent of a peripheral velocity of the at least one screw rotor at a synchronous motor rotational speed for a rated screw compressor capacity, the optimum peripheral velocity is a constant product including the selected rotational speed and a radius of the at least one screw rotor of the at least two screw rotors;
wherein the suction port is sized and located to provide a reduced approach velocity and reduce turbulence for the fluid entering the chamber, the discharge port is sized larger than theoretically necessary to provide a thermodynamic optimum size, and the suction port and the discharge port are configured to reduce a flow loss;

a plurality of bearings positioned close to the discharge port, the plurality of bearings configured to withstand forces of the one or more screw rotors in operation;

a bearing housing configured to directly support only a first bearing of the plurality of bearings, wherein the first bearing of the plurality of bearings is disposed physically between the chamber and a second bearing of the plurality of bearings and abuts the second bearing of the plurality of bearings, wherein the first of the plurality of bearings is configured to withstand radial forces in operation and the second of the plurality of bearings is configured to withstand axial forces in operation; and a muffler, wherein the bearing housing is disposed physically between the muffler and the chamber.

4. The screw compressor of claim 2, wherein the one or more first bearings are disposed physically between the chamber and the one or more second bearings.

5. The screw compressor of claim 3, further comprising a bearing cover configured to directly support the second bearing of the plurality of bearings, wherein the bearing housing is disposed physically between the chamber and the bearing cover in an axial direction.

6. The variable capacity screw compressor of claim 1, wherein the optimum peripheral velocity is in a range between 131 feet per second to 164 feet per second.

7. The variable capacity screw compressor of claim 1, wherein the optimum peripheral velocity is between 137 feet per second to 147 feet per second.

8. The variable capacity screw compressor of claim 1, wherein the at least two screw rotors each have a length that is in a range of 20% to 30% smaller than screw rotors of a conventionally sized screw compressor having a rated capacity same as the rated screw compressor capacity.

* * * * *